United States Patent
Weispfenning

(10) Patent No.: US 8,852,824 B2
(45) Date of Patent: Oct. 7, 2014

(54) METHOD TO GENERATE H2-EXHAUST SENSOR TEST PULSE USING ELECTRICALLY CONTROLLED PRESSURE REGULATOR

(75) Inventor: Thomas Weispfenning, Ober-Ramstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 270 days.

(21) Appl. No.: 13/295,659

(22) Filed: Nov. 14, 2011

(65) Prior Publication Data

US 2013/0122386 A1   May 16, 2013

(51) Int. Cl.
*H01M 8/04* (2006.01)
*H01M 10/63* (2014.01)

(52) U.S. Cl.
CPC ...... *H01M 8/04201* (2013.01); *H01M 8/04082* (2013.01); *H01M 10/502* (2013.01); *H01M 8/04753* (2013.01); *Y02E 60/50* (2013.01); *H01M 8/04462* (2013.01); *H01M 8/04179* (2013.01); *H01M 8/04746* (2013.01); *H01M 8/04298* (2013.01); *H01M 8/04* (2013.01)
USPC ........... 429/443; 429/400; 429/407; 429/408; 429/411; 429/415; 429/427; 429/428; 429/430; 429/431; 429/432; 429/444; 429/448; 429/449

(58) Field of Classification Search
CPC ...................... H01M 8/04201; H01M 8/04462; H01M 8/04753; H01M 10/502; H01M 8/04; H01M 8/04298; H01M 8/04082; H01M 8/04179; H01M 8/04746; Y02E 60/50
USPC ......... 429/400, 407–408, 411, 415, 427–428, 429/430–432, 443–444, 448–449
See application file for complete search history.

(56) References Cited

U.S. PATENT DOCUMENTS

| | | | |
|---|---|---|---|
| 2005/0058861 A1 | 3/2005 | Pettit et al. | |
| 2007/0231625 A1* | 10/2007 | Okumi | 429/13 |
| 2008/0070090 A1* | 3/2008 | Yoshizumi et al. | 429/34 |
| 2011/0302993 A1* | 12/2011 | Kuebel | 73/23.31 |

* cited by examiner

*Primary Examiner* — Patrick Ryan
*Assistant Examiner* — Ben Lewis
(74) *Attorney, Agent, or Firm* — Fraser Clemens Martin & Miller LLC; J. Douglas Miller

(57) ABSTRACT

A fuel cell system for generating a hydrogen test pulse includes a fuel cell stack having an anode inlet in fluid communication with a hydrogen source via a fuel spending line, a cathode inlet in fluid communication with an oxidant source, and an anode outlet and a cathode outlet in fluid communication with an exhaust line. An electric pressure regulator is in fluid communication with the fuel spending line. An overpressure valve is in fluid communication with an overpressure line, which is in fluid communication with the fuel spending line between the electric pressure regulator and the fuel cell stack. A hydrogen sensor is in communication with the exhaust line, and is configured to measure the hydrogen test pulse.

19 Claims, 1 Drawing Sheet

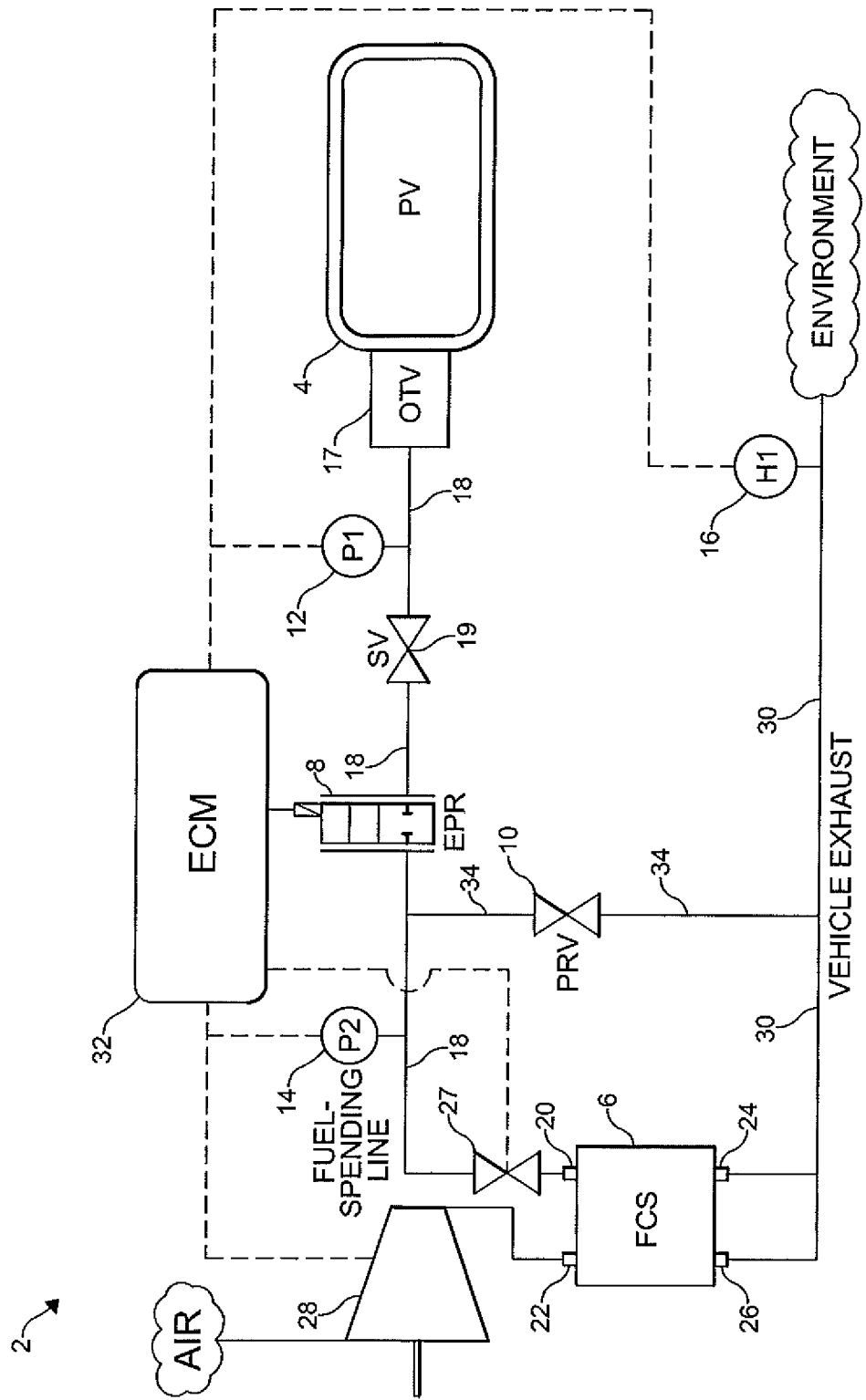

METHOD TO GENERATE H2-EXHAUST SENSOR TEST PULSE USING ELECTRICALLY CONTROLLED PRESSURE REGULATOR

FIELD OF THE INVENTION

This invention relates to a fuel cell system and, more particularly, to a system and method to facilitate a supervision of a hydrogen exhaust sensor in the fuel cell system.

BACKGROUND OF THE INVENTION

A fuel cell has been proposed as a clean, efficient and environmentally responsible power source for various applications. Fuel cells are electrochemical devices which combine a fuel such as hydrogen and an oxidant such as oxygen to produce electricity. The oxygen is typically supplied by an air stream. The hydrogen and oxygen combine to result in the formation of water.

Individual fuel cells can be stacked together in series to form a fuel cell stack capable of supplying a quantity of electricity sufficient to power an electric vehicle. The fuel cell stack has been identified as a potential alternative for a traditional internal-combustion engine used in modern vehicles.

Known fuel cell systems have used a hydrogen sensor in an exhaust of the fuel cell stack to supervise a hydrogen concentration emitted to the environment. However, in typical fuel cell systems, not enough hydrogen is present in the exhaust during normal operation to test the hydrogen sensor. Also, with conventional fuel cell system mechanizations, it has previously not been possible to generate hydrogen exhaust test pulses for diagnosing the hydrogen sensor.

There is a continuing need for a system and method to enable hydrogen sensor diagnostics in a fuel cell system. Desirably, the system and method provide a hydrogen test pulse for testing the hydrogen sensor of the fuel cell system.

SUMMARY OF THE INVENTION

In concordance with the instant disclosure, a system and method to enable hydrogen sensor diagnostics in a fuel cell system, by providing a hydrogen test pulse for testing the hydrogen sensor of the fuel cell system, has surprisingly been discovered.

Analysis has shown that a hydrogen sensor test pulse is beneficial for diagnosis of the hydrogen sensor. Current industry standards, such as IEC 61508 and ISO 26262, for example, require high diagnostic coverage for certain systems.

In an exemplary embodiment, the system and method of the disclosure is configured to generate a hydrogen exhaust test pulse for diagnosis of the hydrogen sensor. The system includes a high pressure vessel (PV) for storing hydrogen. The high pressure vessel may contain pressures up to about 700 bar, for example. An on-tank-valve (OTV) selectively shuts-off the high pressure vessel. A high pressure sensor (P1) is mounted after the on-tank-valve for pressure measurement. A second shut-off-valve (SV) is also provided as a backup to the on-tank-valve. The second shut-off-valve is followed by an electric pressure regulator (EPR) to reduce the pressure from the high pressure level to a level suitable for operation of a fuel-cell-system (FCS), for example, a pressure of about 6-10 bar. The pressure is again measured with a pressure sensor (P2) between the electric pressure regulator and the fuel cell system. To protect the fuel spending line from overpressure, in case of pressure regulator malfunction, an overpressure valve (PRV) is also employed. The overpressure valve normally opens at a predetermined value above the operating pressure of the system, and exhausts the hydrogen in case of activation.

Electrical power is generated within the fuel cell system from the hydrogen in the fuel cell stack from the hydrogen and air that is provided by a compressor. The hydrogen is consumed inside the fuel cell system. An exhaust of the fuel cell stack normally does not contain significant hydrogen concentrations. However, to militate against hydrogen being released to the environment in case of fuel cell system malfunctions, a hydrogen sensor (H1) is used. The hydrogen sensor reading is communicated to an electronic control module (ECM) that closes the on-tank valve and the second shut-off valve in case of measurement of high hydrogen concentrations.

The electric pressure regulator is an active pressure regulator, in contrast to a passive pressure regulator having a predefined pressure setpoint that cannot be changed. The active electric pressure regulator includes a proportional valve controlled externally by the electronic control module. This enables a variation of the flow rate through the proportional valve. Thus, the pressure setpoint of the electric pressure regulator can be finely controlled. The present system and method uses the controlled variability of the electric pressure regulator together with the overpressure valve to generate a test pulse for the hydrogen sensor, without any additional components required for the fuel cell system.

In operation, the electric pressure regulator is controlled to a level at which the overpressure valve opens to selectively feed hydrogen into the exhaust of the fuel cell stack. To determine the rate of hydrogen that is fed to the exhaust, the amount may be calculated by evaluation of the fuel spending line pressure. Together with the known airflow from the air compressor to the exhaust, the resulting concentration is determined and can be compared to the hydrogen sensor reading. This enables hydrogen sensor diagnostics without additional components As described above, for the test pulse generation, it is important to know the amount of hydrogen and the amount of air that is mixed in the exhaust line. The amount of air is generally measured or known, for example, in vehicle applications where the air compressor is employed. For determination of the hydrogen amount the following strategies may be used:

In a situation where the fuel cell system input valve is closed, the electric pressure regulator is controlled with a constant value to open with a very small opening. The flow rate through the electric pressure regulator is proportional to the square root of the pressure difference when the opening orifice is kept constant according to the following equation (1):

$$\dot{n}_2 \sim \sqrt{(p_1^2 - p_2^2)}$$

where $\dot{n}_2$ denoting the moleflow into the fuel spending line.

With P1>>P2, which is usually the case in vehicle applications with P2<10 bar and P1>300 bar, this equation can be simplified to the following equation (2):

$$\dot{n}_2 \sim \sqrt{(p_1^2)}$$

From the equation (2), it can be seen that the flow rate stays constant as long as the driving pressure is constant.

The opening of the electric pressure regulator leads to rising pressure $p_2$ depending on the opening orifice of the electric pressure regulator, the driving pressure P1 and the volume of the fuel spending line. The ideal gas equation for the gas volume in the fuel spending line reads as the following equation (3):

$$p_2 V = n_2 RT$$

Assuming constant T and V within the exhaust line and differentiating with respect to time leads to the following equation (4)

$$\dot{n}_2 = \dot{p}_2 \frac{RT}{V}$$

From the equation (4), the flow rate can be calculated with measured $p_2$ as long as the overpressure valve is still closed. If the value of the electric pressure regulator-control remains unchanged, the hydrogen flow rate stays constant even when overpressure valve opens as long the control value of the electric pressure regulator stays constant. With this constant flow rate together with the air from the air compressor of the fuel cell system, a concentration can be applied to the exhaust sensor to test the component.

Summarizing, the method for generating the test hydrogen pulse includes the following steps:

Closing the fuel cell system input valves;

Opening the electric pressure regulator with a constant value that leads to an expected small hydrogen rate (which is known from the design of the electric pressure regulator);

Calculating an exact rate by measuring the course of $p_2$ from equations (1), (2), (3), and/or (4) and calibration measurements;

Setting the air compressor inside the fuel cell system to deliver a known airflow, which leads to a known exhaust hydrogen concentration when the overpressure valve opens at its setpoint; and Reading a value of the hydrogen sensor and comparing the same to an expected measured concentration.

Using this strategy, a diagnosis of the hydrogen sensor can be performed. Even if it is not planned to have this diagnosis run during normal operation, it could be run in workshops in a special service mode.

In one embodiment, a fuel cell system includes a hydrogen source in fluid communication with a fuel spending line, and a fuel cell stack. The fuel cell stack has an anode inlet in fluid communication with the fuel spending line, and a cathode inlet in fluid communication with an air compressor. The fuel cell stack also has an anode outlet and a cathode outlet in fluid communication with an exhaust line. An electric pressure regulator is in fluid communication with the fuel spending line between the hydrogen source and the fuel cell stack. An overpressure valve is in fluid communication with an overpressure line disposed between the fuel spending line and the exhaust line. The overpressure line is in fluid communication with the fuel spending line between the electric pressure regulator and the fuel cell stack. A first pressure sensor is disposed between the hydrogen source and the electric pressure regulator. A second pressure sensor is disposed between the electric pressure regulator and the fuel cell stack. A hydrogen sensor is in communication with the exhaust line and configured to measure a hydrogen concentration of the exhaust line.

In another embodiment, the fuel cell system further includes an electronic control module. The electronic control module is in communication with the hydrogen sensor, the first pressure sensor, the second pressure sensor, and electric pressure regulator, and the air compressor. The electronic control module operates the electric pressure regulator and the air compressor in response to pressure measurements from at least one of the first pressure sensor and the second pressure sensor to generate a hydrogen test pulse.

In a further embodiment, a method for generating a hydrogen test pulse in the fuel cell system includes the steps of; controlling the electric pressure regulator to permit a constant hydrogen flow rate through the electric pressure regulator; calculating the constant hydrogen flow rate through the electric pressure regulator based on a pressure measurement from at least one of the first pressure sensor and the second pressure sensor; delivering a flow of air from the air compressor to the exhaust line at a known airflow rate; calculating an expected hydrogen concentration in the exhaust line from the known airflow rate and the calculated constant hydrogen flow rate; measuring a detected hydrogen concentration in the exhaust line with the hydrogen sensor; and comparing the measured hydrogen concentration with the expected hydrogen concentration.

BRIEF DESCRIPTION OF THE DRAWINGS

The above, as well as other advantages of the present invention, will become readily apparent to those skilled in the art from the following detailed description of a preferred embodiment when considered in the light of the accompanying FIGURE.

The FIGURE is a schematic diagram of a fuel cell system according to one embodiment of the present disclosure.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The FIGURE shows a fuel cell system 2 according to the present disclosure. The fuel cell system 2 is particularly configured to generate a hydrogen exhaust test pulse for diagnostic purposes. The fuel cell system 2 may be used in a propulsion system for an electric vehicle, as one nonlimiting example. Uses for the fuel cell system 2 other than in the electric vehicle are also within the scope of the present disclosure.

The fuel cell system 2 includes a hydrogen source 4, a fuel cell stack 6, an electric pressure regulator 8, an overpressure valve 10, a first pressure sensor 12, a second pressure sensor 14, and a hydrogen sensor 16. The hydrogen source 4 is in fluid communication with a fuel spending line 18. The hydrogen source 4 may be a pressure vessel configured to contain hydrogen fuel for the fuel cell stack 6. Where the hydrogen source 4 is a pressure vessel, an on-tank valve 17 may be mounted on the pressure vessel for purposes of selectively opening and closing or shutting-off access to the pressure vessel. Similarly, a shut-off valve 19 may also be in fluid communication with the pressure vessel, and be employed as an operational back-up to the on-tank valve 17. One of ordinary skill in the art may use other types of hydrogen sources, such as reformers and the like, as desired.

The fuel cell stack 6 has an anode inlet 20, a cathode inlet 22, an anode outlet 24, and a cathode outlet 26. The anode inlet 20 is in fluid communication with the fuel spending line 18. An anode inlet valve 27 may be in fluid communication with the anode inlet 20 of the fuel cell stack 6. The anode inlet valve 27 reduces a pressure of the fuel spending line 18 to a level that is desired for the fuel cell stack 6 to operate. The anode inlet valve 27 is also configured to selectively shut off a flow of hydrogen from the hydrogen source 4 through the fuel spending line 18 to the fuel cell stack 6, for example, where it is desired to bypass the flow of hydrogen around the fuel cell stack 6. The cathode inlet 22 is in fluid communication with an oxidant source 28 such as an air compressor. The anode outlet 24 and the cathode outlet 26 may be in fluid communication with an exhaust line 30. Like the anode inlet valve 27 of the anode inlet 20, each of the cathode inlet 22, the anode outlet 24, and the cathode outlet 2 may also have shut-off valves (not shown) in communication therewith. It should be appreciated that the exhaust line 30 may be part of a recirculation loop, or may exhaust directly to the environment, as desired.

The electric pressure regulator 8 of the present disclosure is in fluid communication with the fuel spending line 18 between the hydrogen source 4 and the fuel cell stack 6. In a particular embodiment, the electric pressure regulator 8 includes a proportional valve. The proportional valve of the electric pressure regulator 8 may be controlled externally by an electronic control module 32. The electric pressure regulator 8 enables variation of a hydrogen flow rate through the electric pressure regulator, thereby facilitating a controlling of a pressure setpoint within the fuel cell system 2. Other means for controlling the hydrogen flow rate through the electric pressure regulator 8 may also be used within the scope of the present disclosure.

An overpressure line 34 is disposed between the fuel spending line 18 and the exhaust line 30, and provides a means for bypassing a flow of hydrogen around the fuel cell stack 6. In certain embodiments, the overpressure line 34 is in fluid communication with the fuel spending line 18 between the electric pressure regulator 8 and the fuel cell stack 6. The overpressure valve 10 is in fluid communication with the overpressure line 34. The overpressure valve 10 may be a passive valve that opens at a specified or predefined pressure. The overpressure valve 10 is configured to selectively permit flow through the overpressure line 34 when the pressure rises over a predefined value to bypass the flow of hydrogen around the fuel cell stack 6.

The pressure of hydrogen and air within the fuel cell system 2 may be measured at different locations. For example, the first pressure sensor 12 may be disposed between the hydrogen source 4 and the electric pressure regulator 8. In an illustrative embodiment shown in the FIGURE, the first pressure sensor 12 is disposed in the fuel spending line 18 between the on-tank valve 17 of the hydrogen source 4 and the second shut-off valve 19. As a further example, the second pressure sensor 14 may be disposed in the fuel spending line 18 between the electric pressure regulator 8 and the fuel cell stack 6. The first pressure sensor 12 is configured to measure a first pressure of the fuel spending line 18 before the electric pressure regulator 8. The second pressure sensor 14 is configured to measure a second pressure of the fuel spending line 18 after the electric pressure regulator 8. It should be understood that the first pressure sensor 12 may therefore be a high pressure sensor, and the second pressure sensor 14 may be a low pressure sensor.

The hydrogen sensor 16 is in communication with the exhaust line 30. The hydrogen sensor 16 is configured to measure a hydrogen concentration in the exhaust line 30, for example, during an operation of the fuel cell stack 6. One of ordinary skill in the art should appreciate that any type of sensor suitable for measuring the hydrogen concentration may be used as the hydrogen sensor 16 of the present disclosure.

Where the fuel cell system 2 includes the electronic control module 32, the electronic control module 32 may be in communication with at least one of the hydrogen sensor 16, the first pressure sensor 12, the second pressure sensor 14, and electric pressure regulator 8, and the oxidant source 28. The electronic control module 32 may have a processor and a data storage to facilitate both an execution of operating software and an acquisition of data from the various components of the fuel cell system 2.

In certain embodiments, the electronic control module 32 is configured to operate each of the electric pressure regulator 8, and the oxidant source 28. The electronic control module 32 may also receive the pressure measurements from at least one of the first pressure sensor 12 and the second pressure sensor 14, and the hydrogen concentration measurements from the hydrogen sensor 16.

In operation, the fuel cell system 2 of the present disclosure may advantageously be used to generate a test hydrogen pulse for diagnosing or testing the hydrogen sensor 16. A method for generating the hydrogen test pulse in the fuel cell system may first include controlling the electric pressure regulator 8 to permit a constant hydrogen flow rate through the electric pressure regulator 8. In an illustrative embodiment, the constant hydrogen flow rate is selected to be small relative to a flow rate associated with normal operation of the fuel cell stack 6. The constant hydrogen flow rate through the electric pressure regulator 8 may then be calculated based on a pressure measurement from at least one of the first pressure sensor 12 and the second pressure sensor 14.

The constant hydrogen flow rate may be calculated using a variety of strategies. In one embodiment, the constant hydrogen flow rate through the electric pressure regulator may be calculated by the following equation (1):

$$\dot{n}_2 \sim \sqrt{(p_1^2 - p_2^2)}.$$

In another embodiment, where the pressure measurement from the first pressure sensor 12 is greater than the pressure measurement from the second pressure sensor 14, as is typically the case where the open orifice of the electric pressure regulator 8 is suitably small compared to the opening during fuel cell stack 6 operation, the constant hydrogen flow rate through the electric pressure regulator 8 may be calculated by the following equation (2):

$$\dot{n}_2 \sim \sqrt{(p_1^2)}.$$

In a further embodiment, wherein temperature and volume are assumed to be constant, the constant hydrogen flow rate through the electric pressure regulator 8 may be calculated by the following equation (4):

$$\dot{n}_2 = p_2 \frac{RT}{V}.$$

Following the calculation of the constant hydrogen flow rate, a flow of air from the oxidant source 28 is delivered to the exhaust line 30 at a known airflow rate. The flow of air may be delivered through the cathode side of the fuel cell stack 6, or may alternatively be directed around the fuel cell stack and directly to the exhaust line 30, as desired.

With the closed anode inlet valve 27 and constant hydrogen flow rate the pressure in the fuel spending line 18 will increase until the overpressure valve 10 opens. The opening of the overpressure valve 10 permits the flow of hydrogen from the fuel spending line 18 through the overpressure line 34 and into the exhaust line 30. The flow of hydrogen from the fuel spending line 18 mixes with the flow of air from the oxidant source 28 to provide an expected hydrogen concentration in the exhaust line 30 for the hydrogen test pulse. It should be appreciated that multiple hydrogen tests pulses having different expected hydrogen concentrations may be generated, due to the use of the electric pressure regulator 8 of the present disclosure.

The expected hydrogen concentration in the exhaust line 30 may be calculated from the known airflow rate and the calculated constant hydrogen flow rate. A detected hydrogen concentration in the exhaust line 30 may then be measured with the hydrogen sensor 16, and compared to the expected hydrogen concentration for purposes of diagnosing whether the hydrogen sensor 16 is operating properly.

Advantageously, the fuel cell system 2 and the method of the present disclosure facilitate the generation of the hydrogen test pulse without additional componentry, and enable a greater diagnostic coverage for the exhaust hydrogen sensor 16 during the operating lifetime of the fuel cell system 2.

While certain representative embodiments and details have been shown for purposes of illustrating the invention, it will be apparent to those skilled in the art that various changes may be made without departing from the scope of the invention, which is further described in the following appended claims.

What is claimed is:

1. A fuel cell system, comprising:
 a hydrogen source in fluid communication with a fuel spending line;
 a fuel cell stack having an anode inlet in fluid communication with the fuel spending line, a cathode inlet in fluid communication with an oxidant source, and an anode outlet and a cathode outlet in fluid communication with an exhaust line;
 an electric pressure regulator in fluid communication with the fuel spending line between the hydrogen source and the fuel cell stack, the electric pressure regulator in an open position during an operation of the fuel cell stack to admit hydrogen from the hydrogen source to the fuel cell stack;
 an anode inlet valve in fluid communication with the anode inlet of the fuel cell stack;
 an overpressure valve in fluid communication with and disposed between the fuel spending line and the exhaust line, the overpressure valve in fluid communication with the fuel spending line between the electric pressure regulator and the fuel cell stack; and
 a hydrogen sensor in communication with the exhaust line downstream of where the exhaust line is in fluid communication with the overpressure valve, the hydrogen sensor configured to measure a hydrogen concentration of the exhaust line; and
 an electronic control module in communication with the hydrogen sensor, the anode inlet valve to selectively militate against a flow of hydrogen from the fuel spending line to the fuel cell stack and the electric pressure regulator, the electric pressure regulator produces a constant hydrogen flow rate lower than a hydrogen flow rate during the operation of the fuel cell stack when the anode inlet valve is caused to close by the electronic control module, the constant hydrogen flow rate directed through the overpressure valve to the hydrogen sensor and defining an expected hydrogen concentration which is measured by the hydrogen sensor and compared to the hydrogen concentration measured by the hydrogen sensor to test operation of the hydrogen sensor.

2. The fuel cell system of claim 1, wherein the hydrogen source is a pressure vessel having an on-tank valve.

3. The fuel cell system of claim 1, further comprising a shut-off valve disposed between a first pressure sensor in fluid communication with the fuel spending line and the electric pressure regulator.

4. The fuel cell system of claim 1, further comprising a first pressure sensor disposed between the hydrogen source and the electric pressure regulator, wherein the first pressure sensor is a high pressure sensor configured to measure a first pressure.

5. The fuel cell system of claim 4, further comprising a second pressure sensor disposed between the electric pressure regulator and the fuel cell stack, wherein the second pressure sensor is a low pressure sensor configured to measure a second pressure.

6. The fuel cell system of claim 5, wherein the electronic control module is also in communication with the first pressure sensor, the second pressure sensor, and the oxidant source.

7. The fuel cell system of claim 6, wherein the electronic control module operates each of the electric pressure regulator, and the oxidant source.

8. The fuel cell system of claim 6, wherein the electronic control module receives pressure measurements from at least one of the first pressure sensor and the second pressure sensor.

9. The fuel cell system of claim 6, wherein the electronic control module receives hydrogen concentration measurements from the hydrogen sensor.

10. The fuel cell system of claim 1, wherein an overpressure line is in fluid communication with the fuel spending line between the electric pressure regulator and a second pressure sensor in communication with the fuel spending line.

11. The fuel cell system of claim 1, wherein the electric pressure regulator is a proportional valve that permits a variation of a flow rate through the electric pressure regulator.

12. A fuel cell system, comprising:
 a hydrogen source in fluid communication with a fuel spending line;
 a fuel cell stack having an anode inlet in fluid communication with the fuel spending line, a cathode inlet in fluid communication with an air compressor, and an anode outlet and a cathode outlet in fluid communication with an exhaust line;
 an anode inlet valve in fluid communication with the anode inlet of the fuel cell stack, the anode inlet valve closed to selectively militate against a flow of hydrogen from the fuel spending line to the fuel cell stack;
 an electric pressure regulator in fluid communication with the fuel spending line between the hydrogen source and the fuel cell stack, the electric pressure regulator open during an operation of the fuel cell stack to admit hydrogen from the hydrogen source to the fuel cell stack;
 an overpressure valve in fluid communication with an overpressure line disposed between the fuel spending line and the exhaust line, the overpressure line in fluid communication with the fuel spending line between the electric pressure regulator and the fuel cell stack;
 a first pressure sensor disposed between the hydrogen source and the electric pressure regulator;
 a second pressure sensor disposed between the electric pressure regulator and the fuel cell stack;
 a hydrogen sensor in communication with the exhaust line downstream of a junction of the overpressure line and the exhaust line, the hydrogen sensor configured to measure a hydrogen concentration of the exhaust line; and an electronic control module, the electronic control module in communication with the hydrogen sensor, the first pressure sensor, the second pressure sensor, and electric pressure regulator, and the air compressor, wherein the electronic control module operates each of the electric pressure regulator, and the air compressor in response to pressure measurements from at least one of the first pressure sensor and the second pressure sensor to generate a hydrogen test pulse, the electric pressure regulator when the anode inlet valve is closed directed by the electronic control module to produce a constant hydrogen flow rate lower than a hydrogen flow rate during the operation of the fuel cell stack, the constant hydrogen flow rate directed through the overpressure valve to the hydrogen sensor and defining an expected hydrogen concentration which is measured by the hydrogen sensor and compared to the hydrogen concentration measured by the hydrogen sensor to test operation of the hydrogen sensor.

13. A method for generating a hydrogen test pulse in a fuel cell system, the method comprising the steps of:

providing the fuel cell system having a hydrogen source in fluid communication with a fuel spending line, a fuel cell stack having an anode inlet in fluid communication with the fuel spending line, a cathode inlet in fluid communication with an oxidant source, and an anode outlet and a cathode outlet in fluid communication with an exhaust line, an electric pressure regulator in fluid communication with the fuel spending line between the hydrogen source and the fuel cell stack, an overpressure valve in fluid communication with and disposed between the fuel spending line and the exhaust line, the overpressure valve in fluid communication with the fuel spending line between the electric pressure regulator and the fuel cell stack, a first pressure sensor disposed between the hydrogen source and the electric pressure regulator, a second pressure sensor disposed between the electric pressure regulator and the fuel cell stack, and a hydrogen sensor in communication with the exhaust line;

controlling the electric pressure regulator to permit a constant hydrogen flow rate through the electric pressure regulator;

calculating the constant hydrogen flow rate through the electric pressure regulator based on a pressure measurement from at least one of the first pressure sensor and the second pressure sensor;

delivering a flow of air from the oxidant source to the exhaust line at a known airflow rate;

calculating an expected hydrogen concentration in the exhaust line from the known airflow rate and the calculated constant hydrogen flow rate;

measuring a detected hydrogen concentration in the exhaust line with the hydrogen sensor; and comparing the measured hydrogen concentration with the expected hydrogen concentration.

14. The method of claim 13, wherein the fuel cell system further includes an anode inlet valve in fluid communication with the anode inlet of the fuel cell stack and configured to selectively militate against a flow of hydrogen from the fuel spending line to the fuel cell stack.

15. The method of claim 14, further including the step of closing the anode inlet valve prior to the opening of the electric pressure valve.

16. The method of claim 15, wherein the pressure measurement from the first pressure sensor is greater than the pressure measurement from the second pressure sensor.

17. The method of claim 16, wherein the constant hydrogen flow rate through the electric pressure regulator is calculated by the following equation:

$$\dot{n}_2 \sim \sqrt{(p_1^2)}.$$

18. The method of claim 15, wherein temperature and volume are assumed to be constant, and the constant hydrogen flow rate through the electric pressure regulator is calculated by the following equation:

$$\dot{n}_2 = p_2 \frac{RT}{V}.$$

19. The method of claim 15, wherein the constant hydrogen flow rate through the electric pressure regulator is calculated by the following equation:

$$\dot{n}_2 \sim \sqrt{(p_1^2 - p_2^2)}.$$

* * * * *